United States Patent [19]

Oestreich et al.

[11] 4,331,379
[45] May 25, 1982

[54] OPTICAL CABLE WITH THIXOTROPIC FILLING COMPOUND

[75] Inventors: Ulrich Oestreich, Munich; Günter Zeidler, Germering; Gernot Schöber, Munich, all of Fed. Rep. of Germany

[73] Assignee: Siemens Aktiengesellschaft, Berlin & Munich, Fed. Rep. of Germany

[21] Appl. No.: 116,962

[22] Filed: Jan. 30, 1980

[30] Foreign Application Priority Data

Feb. 28, 1979 [DE] Fed. Rep. of Germany ....... 2907704

[51] Int. Cl.³ .............................................. G02B 5/14
[52] U.S. Cl. ................................................. 350/96.23
[58] Field of Search ................... 350/96.23; 174/70 R, 174/110 R–110 E

[56] References Cited

U.S. PATENT DOCUMENTS

| 3,887,265 | 6/1975 | Margolis et al. | 350/96.23 |
| 3,955,878 | 5/1976 | Nowak | 350/96.23 |
| 4,097,119 | 6/1978 | Kumamaru et al. | 350/96.23 |
| 4,153,332 | 5/1979 | Longoi | 350/96.23 |
| 4,259,540 | 3/1981 | Sabia | 350/96.23 X |

FOREIGN PATENT DOCUMENTS

| 2429670 | 1/1975 | Fed. Rep. of Germany . |
| 2434280 | 2/1976 | Fed. Rep. of Germany . |
| 2528991 | 2/1976 | Fed. Rep. of Germany . |
| 2513722 | 9/1976 | Fed. Rep. of Germany . |
| 2628069 | 8/1977 | Fed. Rep. of Germany . |
| 2728553 | 1/1979 | Fed. Rep. of Germany . |
| 52-10738 | 1/1977 | Japan | 350/96.23 |
| 1445732 | 8/1976 | United Kingdom . |
| 1529001 | 10/1978 | United Kingdom . |

OTHER PUBLICATIONS

"SZ Twisting and Stranding of Cables", NTZ, 1970, pp. 473–480.
Miller et al, "Tactical Low Loss Optical Fiber Cable for Army Applications", *Proc. of 13th Int. Wire & Cable Symp.*, Dec. 1974, pp. 266–275.

*Primary Examiner*—John D. Lee
*Attorney, Agent, or Firm*—Hill, Van Santen, Steadman, Chiara & Simpson

[57] ABSTRACT

A strand element for an optical cable which strand element has several light waveguide fibers for transmission of light waves received in a protective casing which surrounds the fibers and has an internal interior diameter which is larger than the exterior diameter of a hypothetical cylinder which surrounds the fibers characterized by each of the fibers being surrounded by a soft elastic material and being stranded with one another, and the space between the stranded optical fibers and the protective casing, which is capable of resistance, being filled with an easily shapeable filling compound which remains very soft and which displays no tendencies towards aging, melting or freezing.

14 Claims, 1 Drawing Figure

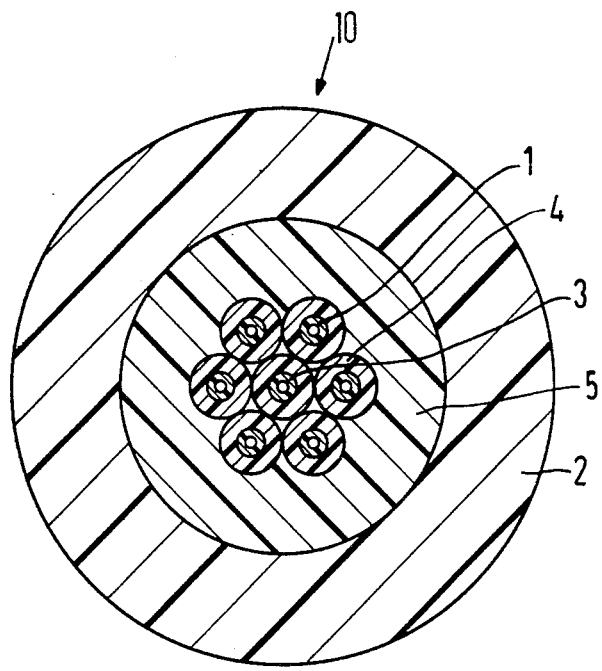

OPTICAL CABLE WITH THIXOTROPIC FILLING COMPOUND

BACKGROUND OF THE INVENTION

The present invention is directed to a strand element for an optical cable which element consists of several light waveguides for the transmission of optical signals or light waves which are received in a protective casing that surrounds the fibers and has an interior diameter which is larger than the exterior diameter of a hypothetical cylinder surrounding the fibers.

A structural element such as a strand element which has light waveguides such as fibers disposed in an outer protective casing with a clearance between the fibers and casing are known and an example is disclosed in German O.S. No. 25 28 991. Since the light waveguide fibers in this type of the construction can move relatively independent of the protective sheath, or casing, the light waveguide fibers are subjected to only low mechanical stresses during the bending of the strand element. However, this property is strictly only present for fibers which are located loosely in a tubular protective sheath. If on the other hand, several fibers are housed in a stretched form in the protective sheath, then bending will cause a mutual shifting of the fibers to occur and this mutual shifting can lead to undesireable mechanical stressing of the fibers.

In practical matters, there exists a need for a cable which has a rather large number of light waveguide fibers in a single housing and the mechanical stress for each fiber which is housed in this cable must be as low as possible. It has been suggested such as disclosed in German O.S. No. 25 28 991 that one can fulfill this demand by positioning each fiber loosely in a tubular protective sheath and to combine the so called hollow sheaths or elements according to known rules of engineering of telecommunication cables into a desireable cable structure. The combining of several light waveguides in one cable is also disclosed in German A.S. No. 26 28 069. In this reference, each of the fibers or communication cores is arranged in the center of the cable, each glass fiber possesses a rigidly applied sheath or coating and several such elements are housed loose and unstranded in a double layer protective casing. A suitable outer sheath or jacket is located over this casing. In general this cable construction is only suited for a limited number of communication elements or cores.

SUMMARY OF THE INVENTION

The present invention is directed to providing a large number of fibers within a light waveguide cable which has a large packing density along with reduced cable cost so that the desireable size for the cable is obtained. The invention begins here with forming a densely packed base zone that serves as a strand element in the case of the manufacturing of cables and it solves the problems which have been posed in the case of strand elements of known kinds.

To accomplish these goals, the invention is directed to an improvement in a strand element for an optical cable, said element consisting of several light waveguide fibers for a light wave transmission and a protective casing which loosely surrounds the fibers, the interior diameter of the casing being larger than the exterior diameter of the hypothetical cylinder surrounding the fibers. The improvement comprises each of the fibers being surrounded by a layer of softly elastic material, said fibers being stranded with one another, said protective casing being a hard protective casing capable of resistance and the space between the optical fibers and the hard protective casing being filled with an easily shapeable filling compound, said filling compound remaining soft and having no tendency towards hardening, aging, melting or freezing.

The filling compound may consist of a thixotropized additive or oil or may be selected from a group of resins consisting of softened polyurethane resin, polyester resin or epoxy resin which have been filled with a suitable oil and these resins are partially cross linked resins. The filling compound displays no tendency worthy of mentioning towards either chemical aging or hardening, or freezing, or melting. The filling compound effects a longitudinal water tightness so that in case of damage to the outer protective casing, water can not spread out in the direction along the communication elements. The filling of the strand element, is a particular advantage since the stranding process for reasons of cost advantageously has a back twist and the cross linking filling compound, such as thixotropized filling compound, prevents an undefined bursting open or expanding of the bundle in the case of cutting of the strand element. The torsion of the fibers, which occur during stranding with back twisting which torsion leads to a surface shearing stress of 100 to 50 N/mm$^2$ when the length of the lay is 100 to 200 mm assumes sufficiently fatigue-limited fibers. Due to this, the length of the lay may be in a range of 50 to 500 mm or in a smaller range of 100 to 300 mm.

In the case of normal dimensions, the fibers should be coated to approximately double their diameter with a surface hardened silicone rubber or other material which is comparably soft to form the elastic layer. On occasion, the stranding must proceed with a back twist, which can be obtained especially easily by means of a certain SZ stranding or cabling method. The term SZ stranding here means a cabling process with alternating direction of lay after a certain number of pitches (further details see NTZ 1970 p 473–480). The length of the lay can be significantly shortened which is advantageous for the flexibility of the product.

The filling compound must be designed to be so soft that it permits the light waveguides sufficient freedom of movement and thus does not contribute to increasing of the attenuation and does not lead to a continuous mechanical stressing of the fibers. By means of stranding, the light waveguide fibers are combined into as small as possible cross section in which the freedom of movement is guaranteed for the total stranded basic bundle by means of a protective sheath which is arranged over it. A particularly advantageous embodiment or form results therefrom in the case of a strand element wherein several cushioned light waveguide fibers are stranded with one another with a large length of lay and as a unit lie loosely in a filled protective casing.

From German O.S. No. 24 29 670, an optical conducting body is known with one or several optical fibers with an exterior protective casing which surrounds the one fiber or several fibers and the inner space between the fiber and the casing or respectively between the fibers and between these fibers and the casings are essentially filled with a paste like medium essentially over the entire length of the optical conducting body. This structure indeed also brings about a water tightness;

however, it does not fulfill its tasks well. The filling medium will freeze at low temperatures and will melt at higher ones. Since the protective casing lies directly upon the fiber bundles, the freedom of movement of the communication leads in the bundles are also greatly eliminated.

In German O.S. No. 24 34 280, a communication line which is constructed out of a light waveguide fiber is disclosed. The fiber is provided with several-layered envelopes for the protection against external mechanical influence. The first layer which borders directly on the light waveguide fiber is designed so that very little movement can occur between the light waveguide fiber and this envelope. This first layer preferably consists of a pulverized or finely granulated material. The arrangement of this type of material is complicated with respect to the manufacturing of the line and is unfavorable with respect to attenuation, which is to be expected in the case of mechanical stresses. If water gets into the sheath, it will freeze and this feature makes the light waveguide useless even when it is only a few centimeters long.

With respect to the solution to the problems provided according to the present invention, it is essential that each light waveguide fiber is surrounded with a cushioning layer of an elastic material in order to assure mutual mechanical decoupling and in order to protect the surfaces of the fiber. It is also essential that these cushioned fibers are stranded with one another, the stranding can be a SZ which will provide a significant evening out of the freedom of movement of the fibers with respect to one another and will hold the fibers together. Finally, the space between these stranded fibers and the protective casing which surrounds the bundle or group of stranded fibers is filled with a compound which will remain soft so that the already longitudinal water-tight property of the strand element will be maintained without noticeably influencing the freedom of movement of the light waveguide fibers in the protective casing. In an advantageous manner, the protective casing can also consist of two layers of synthetic material which have different mechanical characteristics. A two layer protective casing is known per se and is disclosed in German O.S. No. 25 13 722.

It is indeed known, as disclosed in German Pat. No. 2,728,553, to surround a fiber, which lies with clearance in a protective casing, with a protective layer consisting of elastic material. With this arrangement, the freedom of movement of the glass fiber in this sheath or casing will remain approximately the same and the elastic layer will equalize the application of the tensile strains and pressure strains on the casing and fiber so that they are thus rendered nondamaging. However, if one were to combine a large number of these coated light waveguide fibers loosely into a cable, the structure of the arrangement will be relatively large in cross section and expensive.

BRIEF DESCRIPTION OF THE DRAWING

The FIGURE is a cross section of a strand element in accordance with the present invention.

DESCRIPTION OF THE PREFERRED EMBODIMENTS

The principles of the present invention are particularly useful when incorporated in a strand element 10 illustrated in the drawing and used in an optical cable. As illustrated, the strand element 10 includes seven light waveguide fibers 1 which are arranged loosely in a fixed protective casing 2. One of the light waveguides 1 acts as a core element 3 with the remaining six fibers or waveguides 1 surrounding the core. Each fiber is provided with an elastic layer, such as a polyester layer 4, the space between the stranded optical fibers 1 and the casing 2 is filled with a filling compound 5.

The protective casing 2 can advantageously correspond to a normally used communication element and can be embodied for the attainment of specific mechanical, thermal characteristics preferably as a double layer casing. For example, the casing 2 can have an inner layer, which consists of a fluropolymer of, for example, ethylene monochlorotrifluoroethylene. The casing 2 can then have an outer layer consisting of polyterephthalate for example a polybutyleneterephthalate. It is also possible to form the protective casing 2 of a suitable high molecular weight polyolefin for example a polypropylene. If desired, load carrying elements such as glass threads or aramid threads may be included in the material forming the casing to provide longitudinal stress or load carrying elements.

The strand element 10 according to the present invention, provides a desireable structure with relatively low requirement for materials and small cross section, in particular for the case of the combining of the four, seven, or more fibers. In principle, more than seven communication elements can be stranded in the element 10 by using two layers. For example, a core surrounded by a first layer having six fibers and a second layer having 12 fibers or a core surrounded by a first layer with seven fibers and a second layer of 13 fibers. Thus, high packing densities can be obtained without the principles of the present invention becoming invalid.

With these structures, one can further provide the strand element 10 or bundle with the layer strandings which include the core element 3 being a steel or glass fiber synthetic load carrying element. If a steel load carrying element is used, it is preferably surrounded with a cushioning layer. If the strand element 10 is further processed into a finished cable, the strand element, depending upon the type of cable, can be provided with additional reinforcements and with a sheath of a synthetic material. However the strand element will then only display the stability under stress of a non-stranded cable.

In the preferred core construction with seven layers which structure has a single fiber core surrounded by a first layer of six fibers, a second layer of twelve fibers, a third layer of eighteen fibers and so on with seven layers, two hundred and fifty two fibers can be housed in a core diameter of 16.5 mm which will have a cable diameter of approximately 20 mm. The cleaning of the fibers of the filling compound differs only to a small extent from that which is customary for filled cables today. In order to make the manipulation of the individual fiber elements easier, it is recommended that one rubber or cushioning layer of each of the individual fibers has a different color.

Additional especially advantageous embodiments of the strand element are as follows:

According to decadic local cable construction, it is advantageous to construct the basic bundles out of ten fibers or 2×10 fibers. This can occur if a single fiber has been thickened to 1.94 times its diameter and nine additional light waveguide fibers are then stranded or arranged around this fiber. Another possibility is ten light waveguide fibers stranded around a thicker load carrying fiber which was, for example, formed of a cheap glass. The load carrying fiber or element should preferably possess a higher E-module than the light waveguides and it can consist of a natural quartz glass. In a further advantageous embodiment or form, the load carrying fiber could be a stepped index fiber for example a glass-plastic fiber and should be used for signaling or as a service communication line. The strand element with 2×10 fibers which provide each subscriber with a forward and return fiber, is obtained otherwise under the same view point in a construction with one center core surrounded by a first layer with seven fibers and a second layer with thirteen fibers so that the packing density is increased. In the case in which a complete insulating capacity is not required, a steel spring wire surrounded by an elastic cushioned layer for example a 0.2 m diameter wire can be utilized in the strand element.

The cushioning layer 4 can be, a soft elastomer layer with a thickness in a range of 20 to 100 μm. This cushioning layer can be applied during the formation of the fibers. For example, it can be applied in a cold liquid state with a lacquering nible and can be cross linked either by means of furnace treatment or by means of ultra-violet radiation. When applied from a melt phase, it is possible to use thermal plastic elastomers for example a polyolefin base elastomer. Other additional materials that can be used to surround the fibers are a thermal-plastic glass selected from a group consisting of base butadiene-styrene and polypropylene. The fibers can also be coated with a layer of urethane acytate. To improve the manipulation of the fibers, the elastic cushion or layer 4 can be supplemented by means of slide layer and a sedimentation layer.

Besides regular stranding, the basic bundle manufactured by the stranding can also be manufactured by using an SZ stranding method. Then it may also be necessary to hold the strands together by holding means which include a holding coil, or a tightly fitting thin wall tube or casing which can be produced by extrusion. Nevertheless, one will attempt to get by without requiring the holding means. This can be accomplished in the easiest form if the clearance between the bundle and the interior wall of the casing is kept such that the return bend cannot open up. Again, the filling compound can achieve a certain contribution against a bursting open of the bundle if a thixotropic filling compound is used.

In order that the outer protective casing 2 will support the weight of the stranded fibers, it is desireable that the strand elements have an excess length over the ·th of the protective casing. Preferably, this excess length of the strand elements is smaller than 0.1%.

Although various minor modifications may be suggested by those versed in the art, it should be understood that we wish to embody within the scope of the patent granted hereon, all such modifications as reasonably and properly come within the scope of our contribution to the art.

We claim:

1. In a strand element for an optical cable, said element consisting of several light waveguide fibers for light wave transmission and a protective casing which loosely surrounds the fibers, the interior diameter of the casing being larger than the exterior diameter of a hypothetical cylinder surrounding the fibers, the improvements comprising each of the fibers being surrounded by a layer of softly elastic material, said fibers being stranded with one another with a back twist with a long length of lay in a range of between 50 and 500 mm, said protective casing being a hard protective casing capable of resistance, and the space between the optical fibers and the hard protective casing being filled with an easily shapeable filling compound consisting of thixotropized oils, said filling compound remaining soft and having no tendency towards aging, melting or freezing.

2. In a strand element according to claim 1, wherein the length of lay is in a range of approximately 100 to 300 mm.

3. In a strand element according to claim 1, wherein the light waveguide fibers are stranded according to SZ stranding method and include means for keeping the stranded fibers together to prevent bursting open of the stranded bundle, said means being selected from holding coils, holding tubes and casings.

4. In a strand element according to claim 1, wherein the fibers are surrounded with a thermo-plastic elastomer selected from a group consisting of base butadiene-styrene and polypropylene.

5. In a strand element according to claim 1, wherein the fibers are coated with a surface hardening layer consisting of silicone rubber.

6. In a strand element according to claim 1, wherein the fibers are coated with a layer consisting of urethane acrylate.

7. In a strand element according to claim 1, wherein each layer of elastic material surrounding the fibers are colored differently.

8. In a strand element according to claim 1, wherein the strand elements are arranged in a protective casing, said strand elements having an excess length over the length of the protective casing with the excess length being smaller than 0.1%.

9. In a strand element according to claim 1, wherein the protective casing comprises two layers, the inner layer consisting of a fluoropolymer for example ethylene monochlorotrifluoroethylene, and the outer layer consisting of a polyterephthalate, for example a polybutyleneterephthalate.

10. In a strand element according to claim 1, wherein a protective casing consists of a suitable high molecular weight polyolefin for example a polypropylene.

11. In a strand element according to claim 1, wherein the protective casing is strengthened with thread elements selected from glass threads and aramid threads.

12. In a strand element according to claim 1, wherein the light waveguide fibers are stranded around a thick light waveguide serving as a load carrying fiber.

13. In a strand element according to claim 12, wherein the load carrying fiber consists of a non-optical glass.

14. In a strand element according to claim 1, which includes load carrying elements, said load carrying elements comprising steel wires with a surrounding cushioning layer.

* * * * *